(12) United States Patent
Stoner et al.

(10) Patent No.: US 11,247,272 B2
(45) Date of Patent: Feb. 15, 2022

(54) ACHIEVING FUNCTIONALLY-GRADED MATERIAL COMPOSITION THROUGH BICONTINUOUS MESOSTRUCTURAL GEOMETRY IN ADDITIVE MANUFACTURING

(71) Applicant: The Penn State Research Foundation, University Park, PA (US)

(72) Inventors: Brant Edward Stoner, State College, PA (US); Joseph Bartolai, State College, PA (US); Dorcas Vivian Kaweesa, State College, PA (US); Nicholas A. Meisel, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 192 days.

(21) Appl. No.: 16/636,872

(22) PCT Filed: Aug. 6, 2018

(86) PCT No.: PCT/US2018/045364
§ 371 (c)(1),
(2) Date: Feb. 5, 2020

(87) PCT Pub. No.: WO2019/032449
PCT Pub. Date: Feb. 14, 2019

(65) Prior Publication Data
US 2020/0391290 A1    Dec. 17, 2020

Related U.S. Application Data

(60) Provisional application No. 62/542,054, filed on Aug. 7, 2017.

(51) Int. Cl.
*B33Y 10/00* (2015.01)
*B22F 10/20* (2021.01)
(Continued)

(52) U.S. Cl.
CPC .............. *B22F 10/20* (2021.01); *B22F 10/30* (2021.01); *B22F 2207/01* (2013.01);
(Continued)

(58) Field of Classification Search
CPC ......... B33Y 10/00; B33Y 30/00; B33Y 50/02; B22F 2207/01; B22F 2207/11
See application file for complete search history.

(56) References Cited

U.S. PATENT DOCUMENTS

| 5,594,652 A | 1/1997 | Penn et al. |
| 8,195,023 B1 | 6/2012 | Jacobsen et al. |

(Continued)

FOREIGN PATENT DOCUMENTS

DE    102014215587 A1    2/2016

OTHER PUBLICATIONS

S.H. Choi et al., "A topological heirarchy-based approach to layered manufacturing of functionally graded multi-material objects", Computers in Industry, Jun. 1, 2009, pp. 349-363, vol. 60, No. 5; (Year: 2009).*

(Continued)

*Primary Examiner* — Yung-Sheng M Tsui
*Assistant Examiner* — Melody Tsui
(74) *Attorney, Agent, or Firm* — Dinsmore & Shohl LLP (57) ABSTRACT

A method of creating a functionally-graded multi-material (FGM) part in multi-material additive manufacturing includes providing a part digitized into voxels, generating a lattice structure having a series of repeating unit cells, where each is the smallest nonrepeating constituent of the lattice structure and is generated by a continuous surface defined by a continuous function. The method further includes taking an inverse volume of the lattice structure within the part, creating a material gradient by varying a thickness of the surface at the boundary between the lattice structure and the (Continued)

inverse volume, assigning one of the two FGM component materials to the voxels in the volume occupied by the lattice structure and assigning the other to the voxels occupied by the inverse volume, outputting the voxels each with a designated material, the lattice structure and the inverse volume forming a mechanical interlock at the interface of the two component materials.

11 Claims, 11 Drawing Sheets

(51) Int. Cl.
    *B33Y 30/00*         (2015.01)
    *B33Y 50/02*         (2015.01)
    *B22F 10/30*         (2021.01)

(52) U.S. Cl.
    CPC ....... *B22F 2207/11* (2013.01); *B22F 2999/00* (2013.01); *B33Y 10/00* (2014.12); *B33Y 30/00* (2014.12); *B33Y 50/02* (2014.12)

(56) References Cited

U.S. PATENT DOCUMENTS

2015/0306666 A1   10/2015   Honda
2016/0137839 A1*   5/2016   Rolland ............... C08G 18/755
                                               522/81
2016/0168453 A1*   6/2016   Florio ...................... C09K 8/80
                                               507/203
2017/0372513 A1*  12/2017   Zeng ........................ G06T 17/00

OTHER PUBLICATIONS

Zhou et al., "Development of a Multi-material Mask-lmage-Projection-based Stereolithography for the Fabrication of Digital Materials", http://utwired.engr.utexas.edu/lff/symposium/proceedingsArchive/pubs/Manu-scripts/2011/2011-06-Zhou.pdf. (Year: 2011).*

Heterogeneous object modeling: A review; X.Y. Kou, S T. Tan, Received May 23, 2006; accepted Dec. 20, 2006.

Muller et al. "Modeling and control of a direct laser powder deposition process for Functionally graded materials (FGM) parts manufacturing. " In: journal of materials processing technology. Dec. 4, 2012 (Dec. 4, 2012).

International Search Report dated Oct. 12, 2018, International Application No. PCT/US2018/045364.

ISO/ASTM, 52900-2015: Additive manufacturing—General principles—Terminology, 2015.

M.L. Griffith, L.D. Harwell, J.T. Romero, E. Schlienger, C.L. Atwood, and J.E. Smugeresky, Multi-Material Processing by LENS, Proc. 8th Solid Free. Fabr. Symp., pp. 387-394, 1997.

Higher-order theory for functionally graded materials, J. Aboudi, M.J. Pindera, and S.M. Arnold, Compos. Part B Eng., vol. 30 No. 8, pp. 777-832, 1999.

* cited by examiner

ACHIEVING FUNCTIONALLY-GRADED MATERIAL COMPOSITION THROUGH BICONTINUOUS MESOSTRUCTURAL GEOMETRY IN ADDITIVE MANUFACTURING

REFERENCE TO RELATED APPLICATION

This application is the U.S. National Stage of PCT/US2018/045364 filed Aug. 6, 2018, which claims priority from U.S. Provisional Patent Application Ser. No. 62/542,054, filed Aug. 7, 2017, the entire content of which is incorporated herein by reference.

CROSS REFERENCE

This application is the U.S. National Stage of PCT/US2018/045364 filed Aug. 6, 2018, which claims priority from U.S. Provisional Patent Application Ser. No. 62/542,054, filed Aug. 7, 2017, the entire content of which is incorporated herein by reference.

FIELD OF THE INVENTION

The present invention relates to achieving functionally-graded material composition in additive manufacturing, specifically, using bicontinuous mesostructural geometry.

BACKGROUND OF THE INVENTION

Functionally Graded Materials (FGMs) represent a new regime of composites comprised of two or more materials that continuously or discretely transition from one material to another throughout the bulk of a structure. First proposed in 1980 by Hirai et al. [1] as a solution to meet the extreme thermal conditions seen on the skin of spacecraft, FGMs allow for a structure to exhibit multiple physical properties that are not possible within the same part using conventional material processing techniques. For example, certain areas of a part can be optimized for corrosion resistance while other areas are optimized for thermal response, all within the same bulk structure.

There are currently three additive manufacturing (AM) processes capable of creating FGMs: material jetting, directed energy deposition (DED), and material extrusion. In material jetting, droplets of build material are selectively deposited according to a predefined dithering pattern to form each layer of the part and ultimately cured using ultraviolet light [2]. This dithering method allows for FGMs to be designed because material can be specified on the voxel (three dimensional pixel) level. DED is an AM process in which focused thermal energy is used to fuse deposited powdered metal by melting. FGMs are created in DED by mixing powder forms of the two materials prior to the deposition process [3]. The material gradient is achieved by varying the volume fraction of each material sent to the deposition nozzle. Material extrusion is an AM process where material is selectively deposited through a nozzle or orifice [2]. By either adding additional nozzles or embedding other material into the filament FGMs are able to be produced using this method.

Both dithering and material mixing result in isolated inclusions of one of the two component materials suspended within a matrix of the other material. This phenomenon also occurs when creating FGMs using traditional powder-based manufacturing methods. When the part is mechanically loaded, the transfer of forces between the two component materials relies on traction at the matrix-inclusion interface [4]. By relying on traction, the FGM cannot fully utilize the inherent mechanical strength of the included material, reducing its overall performance. If the FGM could be created in such a way that each component material would exist as a continuous entity, this reliance on traction could be avoided.

A vast majority of material extrusion AM machines produce FGMs through step interfaces by dual material extrusion, though some methods use unique extrusion systems that allow them to produce more complex gradient types. These approaches are in their infancy and have not disseminated into the market yet. Step interfaces pose a few issues with respect to FGMs. First the interface strength between step interfaces suffers, mainly because the strength at the interface is not reinforced by cross hatching subsequent layers but relies solely on diffusion welding between the interfaces. Secondly non miscible materials may not be used to create these interfaces because diffusion welds will not form over the interface. This restricts the production of FGMs to similar materials which undermines the purpose of FGMS.

SUMMARY OF THE INVENTION

The present invention provides a method of creating a functionally-graded multi-material (FGM) part in a multi-material additive manufacturing (AM) process. The AM process may be material jetting, directed energy deposition, material extrusion or any suitable additive manufacturing process. The FGM part may include at least two component materials.

According to an embodiment of the present invention, the FGM part can be designed using a lattice structure formed by a series of repeating unit cells defined by a continuous function.

In an example of creating a two-component FGM part, an original geometry of the part is first provided and digitized into voxels. Then a unit cell can be generated by a surface defined by a continuous function. The surface may be a triply periodic minimal surface (TPMS) including Gyroid, P surface, D surface, and Lidinoid. The lattice structure represents one of the two component materials.

Next, an inverse volume of the lattice structure within the part is taken to represent the other of the two component materials.

The material gradient may be created by varying the thickness of the surface at the boundary between the lattice structure and the inverse volume.

The lattice structure and the inverse volume are each continuous discrete structure and form a bicontinous mesostructure of the part. The lattice structure and the inverse volume forms a mechanical interlock at the interface of the two component materials.

Each voxel is assigned one of the two FGM component materials. The voxels in the volume occupied by the lattice structure is assigned one of the two FGM component materials and the voxels in the volume occupied by the inverse volume is assigned the other of the two FGM component materials. The voxels each with a designated material is outputted as a data file and the part is manufactured based on the data file.

In some embodiments, the multi-material part includes more than two component materials. The component materials may be immiscible.

The unit cell type, voxel size, and AM machine minimum feature size may be chosen to act as starting blocks for producing the bicontinous mesostructure.

The resolution of the part can be adjusted by adjusting the voxel size or the minimum feature size of the AM machine.

The voxel size may be set to half of the minimum feature size of the additive manufacturing machine or an intended layer thickness, whichever is smaller, to minimize the stair casing effect. The voxelized representation converges to the geometry as the voxel size approaches zero.

The unit cell type can be selected by varying parameters of the unit cell including a unit cell period, a unit cell period gradient, gradient bounds and/or a unit cell orientation.

BRIEF DESCRIPTION OF THE INVENTION

DETAILED DESCRIPTION OF THE INVENTION

The present invention provides a method for generating a functionally-graded multi-material component. In one example, the component is a bi-material component. Continuous functions are used to define the volume fraction of each component material throughout the material gradient. Because both component materials exist as continuous structures, the mechanical interlock of those two structures adds to the strength of the material interface that would exist only due to traction and/or miscible welding at the material interfaces. If a tri-continuous function was used to determine the material distribution, then yes, three component materials could be used.

Figure 1:
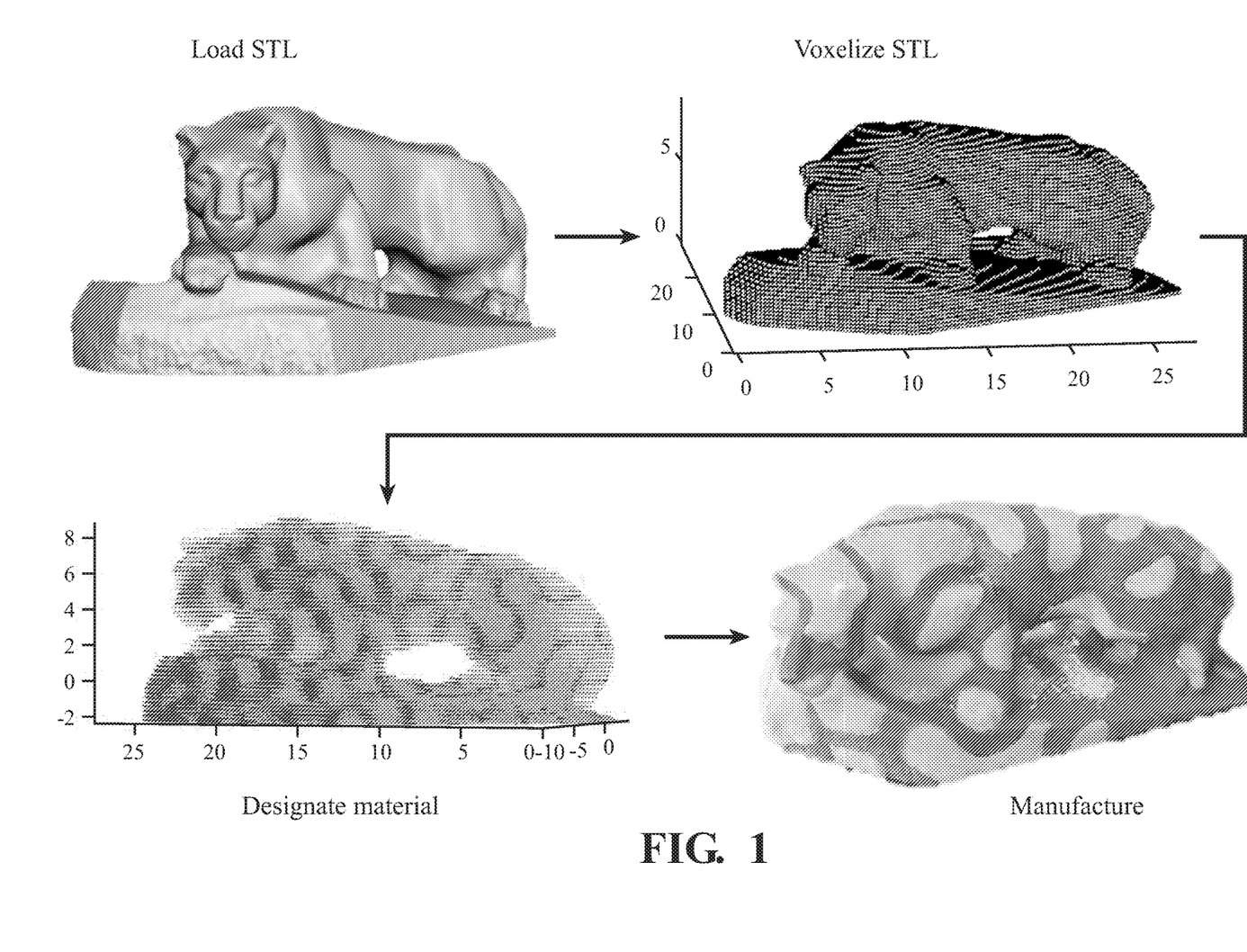
FIG. 1 is an example showing a methodology overview for achieving a functionally graded part produced from a part geometry.

An example of the process for creating a bi-continuous mesostructure is summarized in FIG. 1. Lattice structures are defined by a series of geometrically repeated trusses or shapes each called a unit cell, which consists of the smallest nonrepeating constituents of the lattice. Combining unit cells in a repeated fashion forms the mesostructure of a component. In the present invention, the unit cell is generated implicitly, by using a continuous surface defined by a closed-form equation such as a triply periodic minimal surface (TPMS).

Upper left of FIG. 1 shows an original geometry of an input part. The original part geometry is first digitized into voxels, as shown in upper right of FIG. 1. An implicitly generated graded lattice structure is applied to the part geometry. This lattice structure is then Booleaned with the original geometry. The volume occupied by the graded lattice structure and the Boolean result volume are each assigned one of the two FGM component materials. This is shown in bottom left of FIG. 1. The two component material volumes are then combined and produced as a single functionally graded multi-material part, as shown in bottom right of FIG. 1. The detail of each step will be provided hereinbelow.

Design Work Flow

Figure 2:
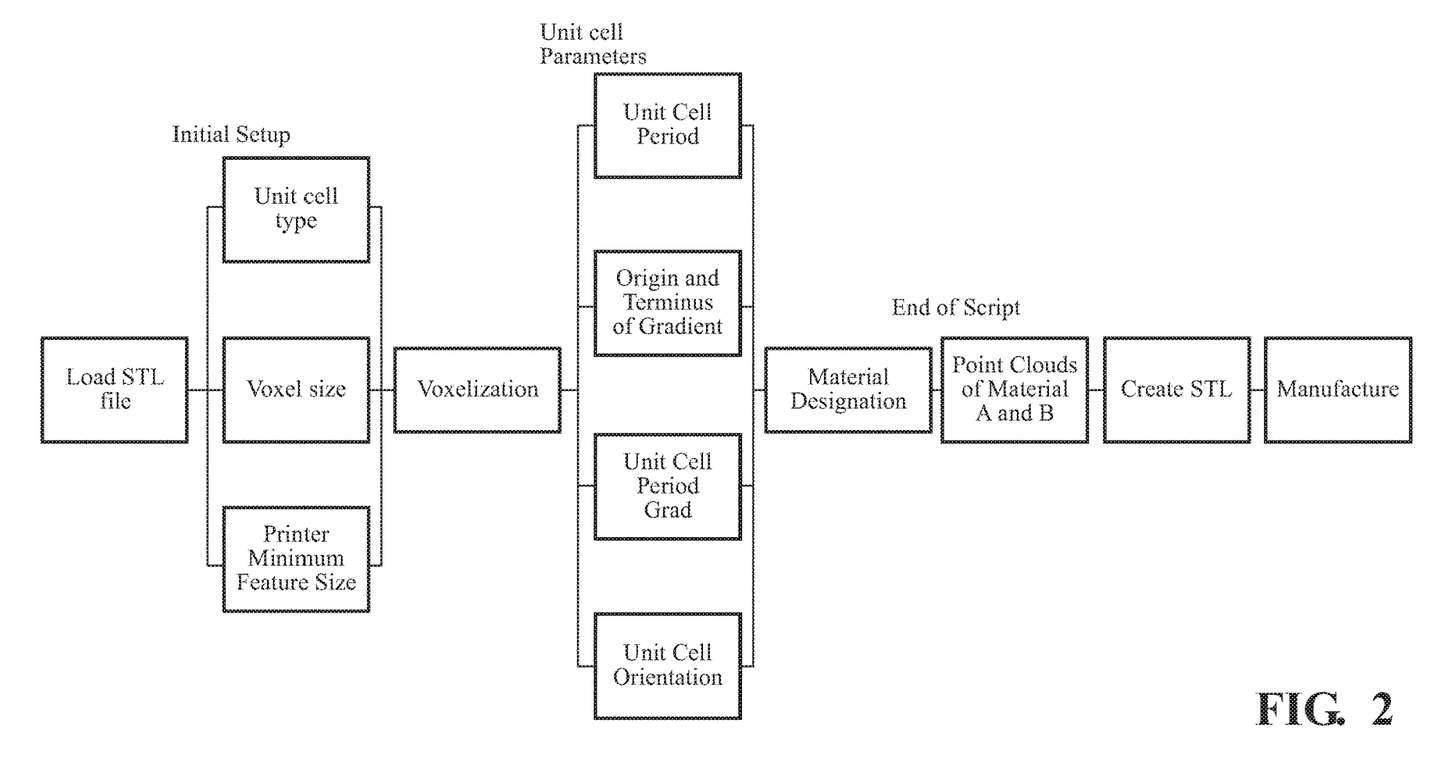
FIG. 2 is a flowchart showing a bicontinuous mesostructure design workflow.

The unit cell parameters and detailed work flow can be seen in FIG. 2. First, we will briefly describe each of the steps in the work flow. The detailed information regarding each step will be described in respective sections below.

Initial setup consists of loading the stereolithography (STL) file, which is the file format that can be recognized by an additive manufacturing (AM) machine. The unit cell type, voxel size, and AM printer minimum feature size may then be chosen. These three parameters act as starting blocks for producing the bicontinous mesostructure. The unit cell type defines the geometry that will be used in the lattice structure. Voxel size determines the resolution of the final part and the printer's minimum feature size defines the smallest feature that will be generated in the lattice. Minimum feature size is the smallest an object can be made and be built successfully. Resolution is the accuracy to which features can be reproduced. Resolution is often smaller than minimum feature size in AM machines. Initially a wide range of independent parameters were created to allow as much flexibility and design ideation as possible. The intended geometry is then voxelized and unit cell parameters are applied. Each voxel is then designated a material type which is outputted as a point cloud. This point cloud is converted to an STL file to be manufactured.

Voxelization

Figure 3A:
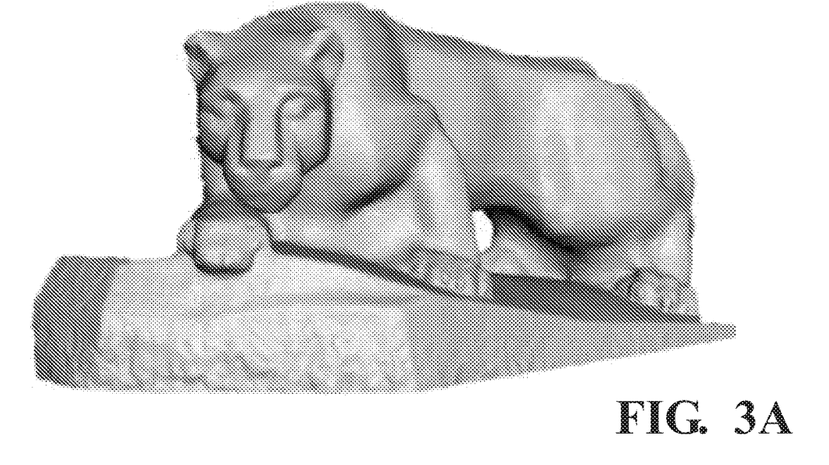
FIG. 3A-3C is a comparison of geometry voxelization at different voxel sizes, with an original geometry in FIG. 3A, a 1 mm voxel representation in FIG. 3B and a 0.25 mm voxel representation in FIG. 3C.
Figure 3B:
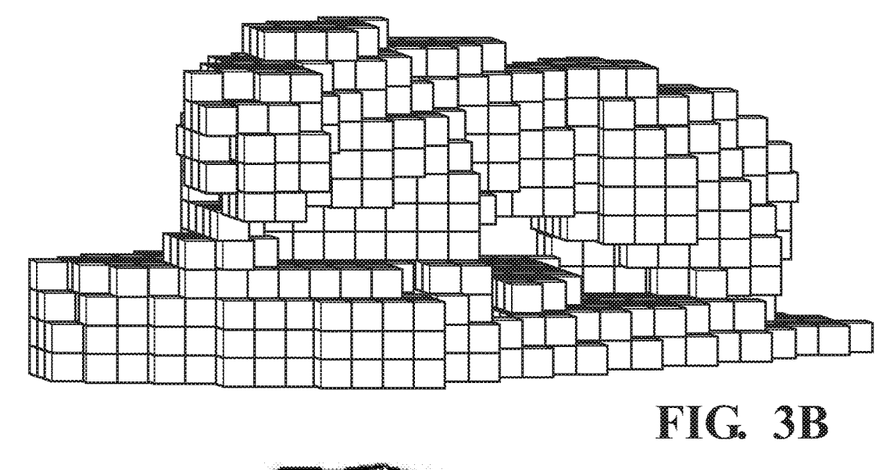
Figure 3C:
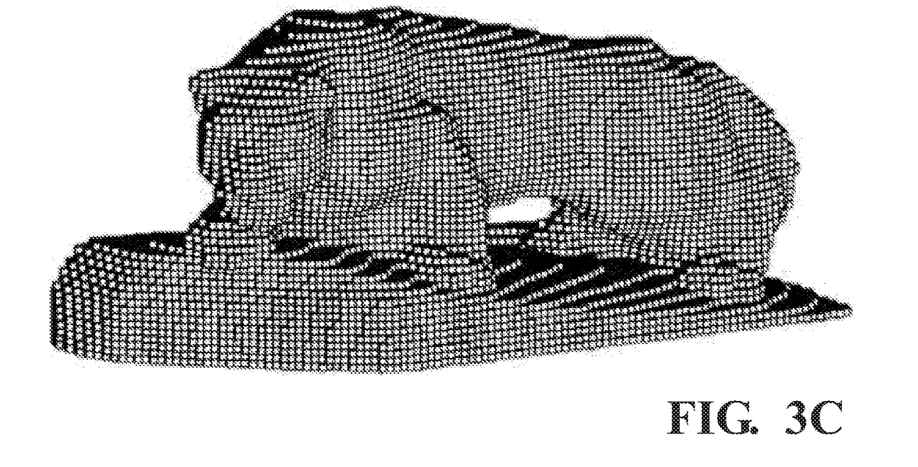

A voxel representation scheme is used to discretize the part. This has two key advantages: first, it simplifies complex surfaces and bodies to a list of points and faces; second, each voxel can be assigned a set of different properties, be it color, strength, or in this case material. The voxelization process does produce some geometrical error, mainly staircasing and reduction in resolution, due to the discretization process. Stair casing is the result of using a rectangular prism to discretize a part. To minimize the stair casing effect, the voxel size should to be set to half of the minimum feature size or intended layer thickness, whichever is smaller. This is so that errors created by the voxelization process do not compound with errors produced by slicing the final STL. The resolution of the voxelized representation is based on the size of the unit cell. FIGS. 3A-3C show the voxel representation at different levels of resolution of an initial STL file. As the voxel size approaches zero, the voxelized representation converges to the original STL geometry.

Unit Cell

In one example, the lattice structure is generated implicitly, by using a triply periodic minimal surface (TPMS) defined by a closed-form equation. One period of the TPMS forms the unit cell for the lattice structure. The four TPMS explored are Schoen's gyroid, Schwarz P and D surfaces, and Lidin's Lidinoid. These four TPMS are defined by Equations 1 through 4

Equation 1, Schoen's Gyroid [13]:

$$\sin(x)\cos(y)+\sin(y)\cos(z)+\sin(z)\cos(x)=0 \quad (1)$$

Equation 2, Schwarz P-Surface [13]:

$$\cos(x)+\cos(y)+\cos(z)=0 \quad (2)$$

Equation 3, Schwarz D-Surface [13]:

$$\sin(x)\sin(y)\sin(z)+\sin(x)\sin(y)\cos(z)+\cos(x)\sin(y)\cos(z)+\cos(x)\cos(y)\sin(z)=0 \quad (3)$$

Equation 4, Lidinoid [17]:

$$\tfrac{1}{2}[\sin(2x)\cos(y)\sin(z)+\sin(2y)\cos(z)\sin(x)+\sin(2z)\cos(x)\sin(y)]-\tfrac{1}{2}[\cos(2x)\cos(2y)+\cos(2y)\cos(2x)+\cos(2z)\cos(2x)]+0.15=0$$

The FGM is created by assigning one material to the surface defined by one of the four surface equations, and assigning the other material to the surrounding volume. In this process, variations in material compositions are produced using changes in lattice geometry. The material gradient is created by varying the thickness of the surface between the user defined gradient endpoints. If a point $\{x,y,z\}$ satisfies one of the minimal surface equations, that point lies on the surface defined by that equation. By definition, these surfaces have zero thickness. Adjusting the surface equation so that the absolute value of the function is evaluated in an inequality allows a non-zero thickness surface to be defined. Scaling terms are also added to define the period of the minimal surface. An example of this is shown for the gyroid in equation 5.

$$\left|\sin\left(\frac{2\pi}{P}x\right)\cos\left(\frac{2\pi}{P}y\right)+\sin\left(\frac{2\pi}{P}y\right)\cos\left(\frac{2\pi}{P}z\right)+\sin\left(\frac{2\pi}{P}z\right)\cos\left(\frac{2\pi}{P}x\right)\right|\leq t \quad (5)$$

Where x, y, and z are the Cartesian coordinates of any location in the part, relative to the part local coordinate frame; P is the period of the minimal surface; and t is a unitless thickness value. This thickness value varies across the material gradient region, from a minimum value, which is scaled to the minimum feature size of the process and the machine to be used to produce the part, to the maximum possible value of the function. In the case of the gyroid, this maximum value is 1.5. In this example, the thickness value is scaled linearly between the minimum and maximum values across the material gradient region.

Because each of the TPMS used are defined by continuous equations, surface thickness and period parameters can be changed not only across the material gradient region, but within each unit cell as well.

Figure 4:
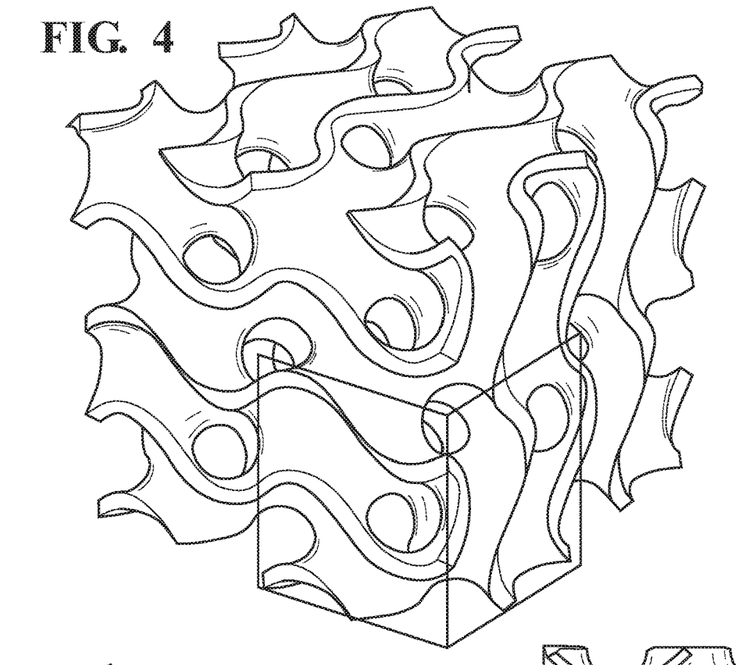
FIG. 4 is a sketch showing geometry of Schoen's Gyroid structure.
Figure 4A:
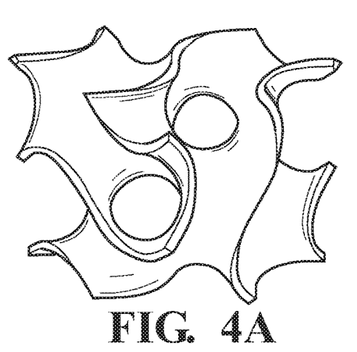
FIG. 4A is a sketch showing an isometric view of a unit cell of Schoen's Gyroid structure of FIG. 4.
Figure 4B:
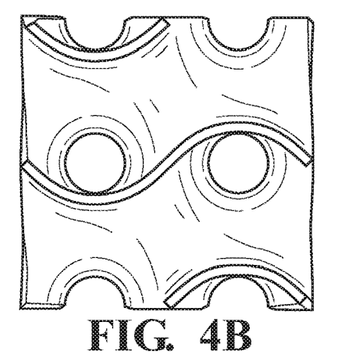
FIG. 4B is a sketch showing a right-side view of a unit cell of Schoen's Gyroid structure of FIG. 4.
Figure 4C:
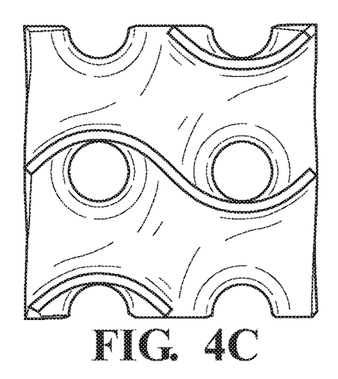
FIG. 4C is a sketch showing a front view of a unit cell of Schoen's Gyroid structure of FIG. 4.
Figure 4D:
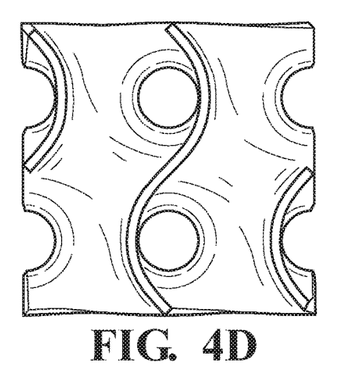
FIG. 4D is a sketch showing a top view of a corner of Schoen's Gyroid structure of FIG. 4.

FIG. 4 shows a lattice structure with the unit cell having the geometry of a Schoen's Gyroid structure. The unit cell, as marked by the frame, is shown from a different view in each of FIGS. 4A to 4D.

Figure 5:
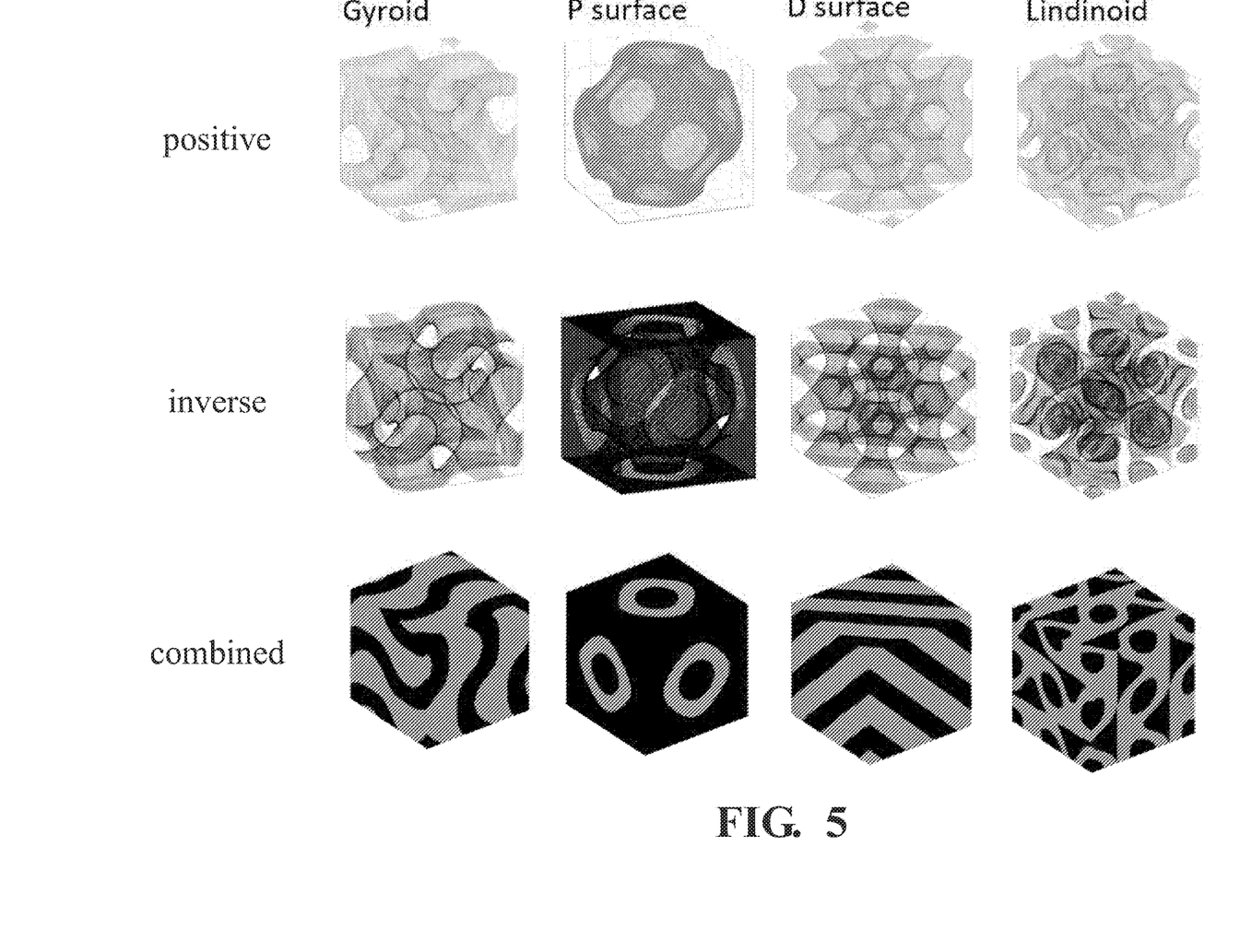
FIG. 5 is a grid of images showing examples of positive, inverse and combined unit cells for the Gyroid, P surface, D surface, and Lindinoid.
Figure 6A:
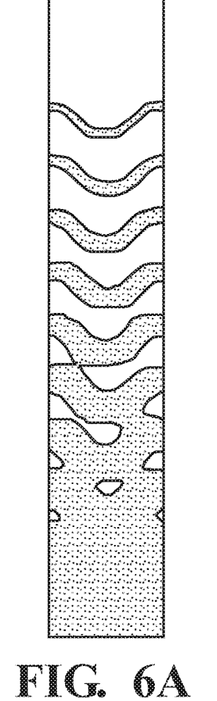
FIG. 6A is a sketch showing a side view of a graded unit cell in accordance with an embodiment of the present invention.
Figure 6B:
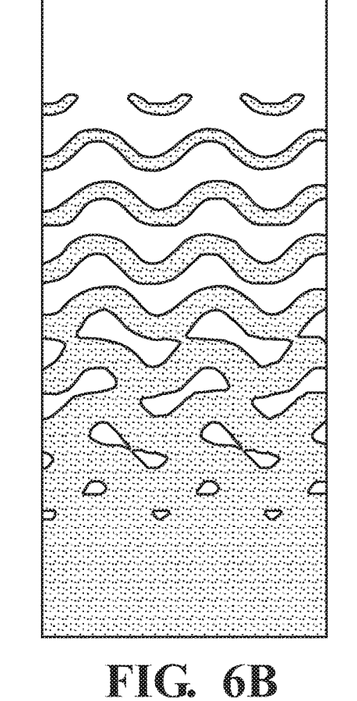
FIG. 6B is a sketch showing a front view of a graded unit cell in accordance with an embodiment of the present invention.

FIG. 5 shows the positive, inverse, and combined unit cells for Gyroid, P surface, D surface, and Lidinoid. FIGS. 6A and 6B show a side and a front view of a graded lattice unit cell in accordance with an embodiment of the present invention. Any arbitrary geometry could also be implemented using this method, so long as the unit cell can be in represented in a continuous, parametric fashion. Unit cell design does not need to be limited to self-supporting geometries because downward facing surfaces will be supported by the other component material structure as the part is manufactured. This opens the design space to unit cells that were not previously feasible to manufacture additively.

Unit Cell Parameters

The explicit closed-form nature of the selected TPMS allow for easy manipulation of the unit cell. Several unit cell parameters can be adjusted to fit the desired application. These parameters are the (i) period of the unit cell, (ii) origin and terminus of the gradient, (iii) unit cell period gradient, and (iv) unit cell orientation. Each of these parameters can be adjusted independently of the other three. The structure created by the negative space of the TPMS equation could be discontinuous if the thickness and period bounds of the TPMS were set to certain values. So the parameters should be selected such that both the structure defined by the TPMS equation and the inverse structure defined by the negative space of the TPMS equation are continuous.

Figure 7:
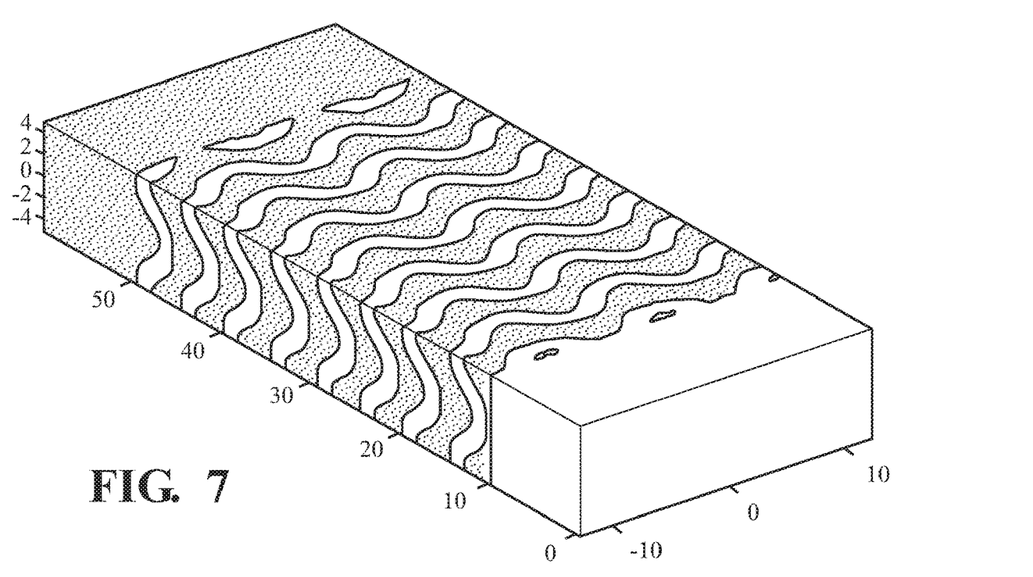
FIG. 7 is a schematic showing a resultant mesostructure when using the baseline design parameters.

To give a consistent reference for comparison between different parameter values, the rectangular prism shown in FIG. 7 will be considered to have baseline parameter values. This reference will be used to show how changes in each parameter affect the mesostructure. The reference geometry is 20 mm×60 mm×10 mm and uses a gyroid unit cell with a period of 10 mm. The gradient bounds are defined by two parallel planes at (0, 10, 0) and (0, 50, 0). The period of the unit cell is constant throughout the part. Lastly, the orientation of the unit cell is defined by the vector axis (0, 1, 0).

1. Unit Cell Period

Figure 8A:
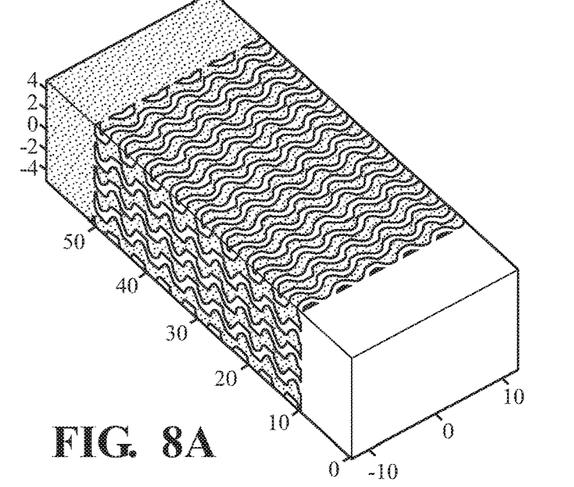
FIGS. 8A-8C are schematics showing the effect of changing a triply periodic minimal surface (TPMS) period on mesostructure geometry, with a period of 5 mm in FIG. 8A, a period of 10 mm in FIG. 8B and a period of 20 mm in FIG. 8C.
Figures 8B, 8C:
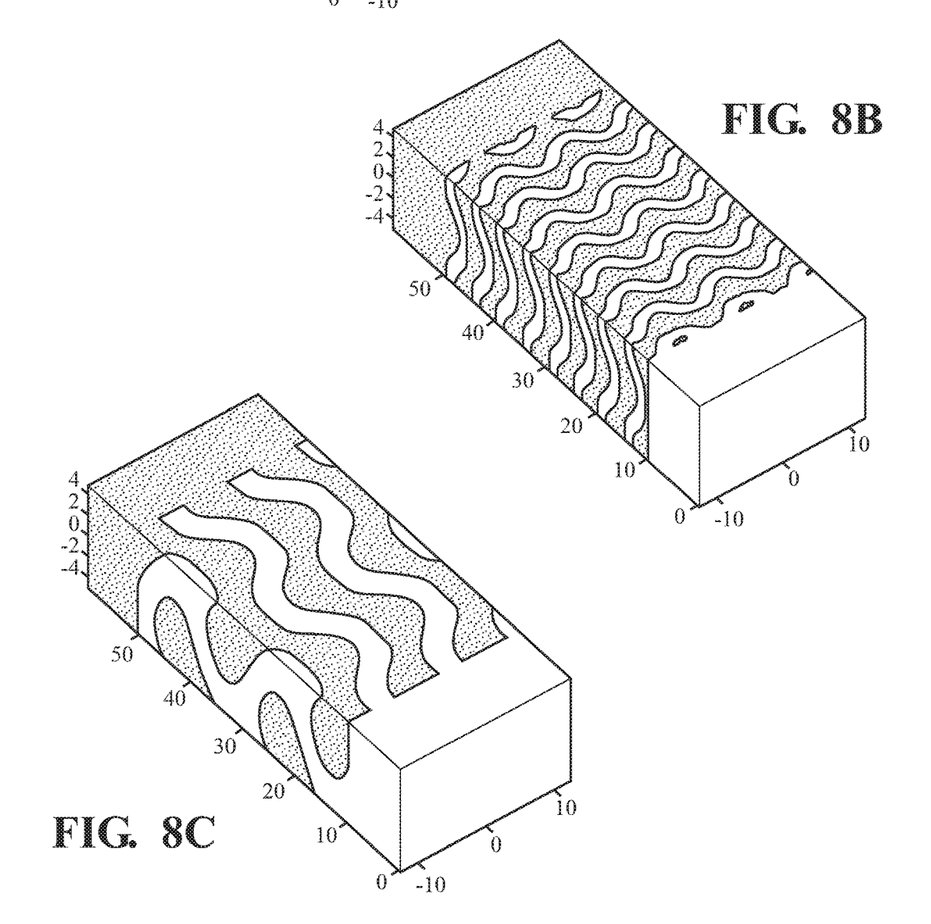

The first parameter to be set is the period of the TPMS (in millimeters); this effectively controls the size of the unit cell. The size of the unit cell affects the granularity of the functional gradient between the two materials. This is illustrated in FIGS. 8A-8C: shorter periods of P=5 in FIG. 8A and P=10 in FIG. 8B result in closer approximation to a conventional functional gradient while a larger period of P=20 in FIG. 8C shows a distinct heterogeneous combination of the two materials. As the period length approaches zero, the bicontinuous mesostructure becomes a conventional functional gradient.

2. Gradient Bounds

Figure 9A:
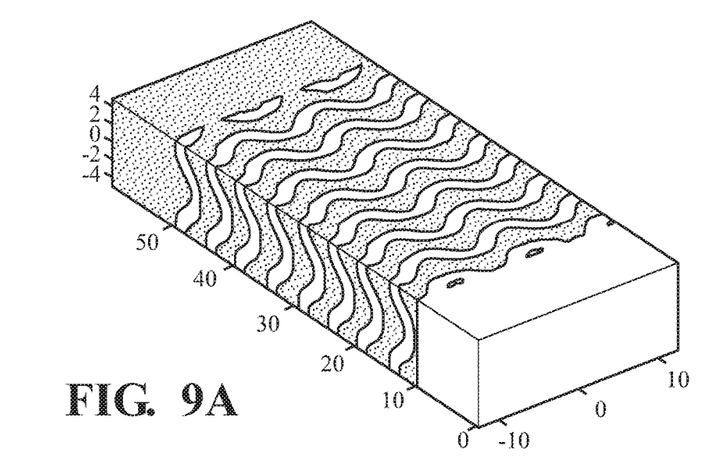
FIGS. 9A-9D are schematics showing the effect of moving the mesostructure endpoints, with a spacing of 40 mm, with origin and terminus planes with a normal vector of {1,0,0} in FIG. 9A, with a spacing of 20 mm, with origin and terminus planes with a normal vector of {1,0,0} in FIG. 9B, with a spacing of 20 mm, with origin and terminus planes with a normal vector of {0,1,0} in FIG. 9C, and with a spacing of 40 mm, with origin and terminus planes with a normal vector of {0.7,0.7,0.3} in FIG. 9D.
Figure 9B:
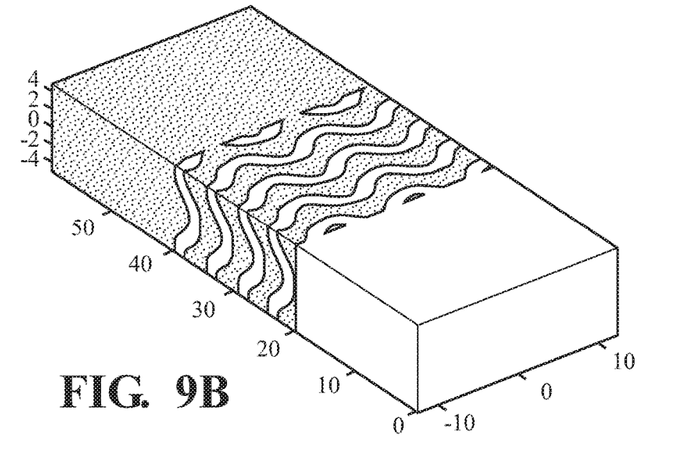
Figure 9C:
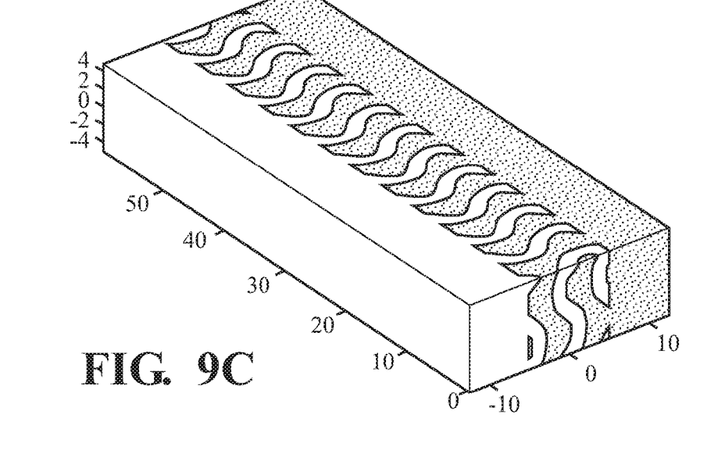
Figure 9D:
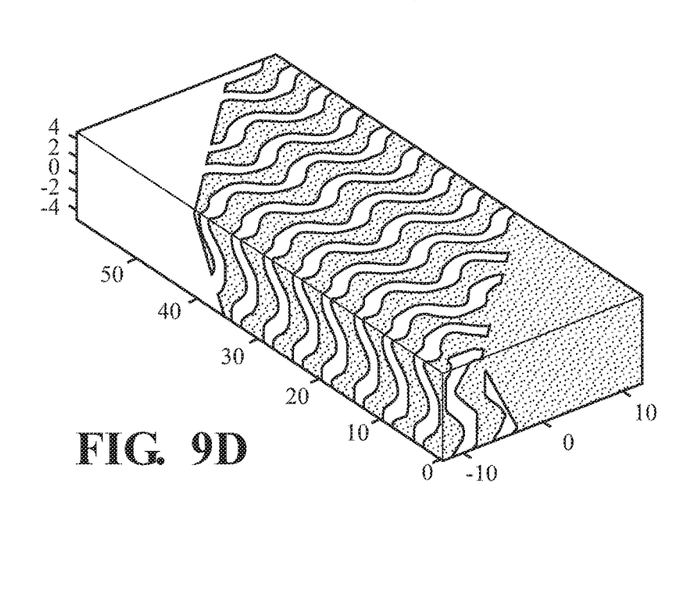

The gradient origin and terminus planes are determined by user generated origin and terminus points. Planes are generated through the origin and terminus points using the vector between these points as the normal vector for each of the two planes. These endpoints are in the form of Cartesian coordinates (x, y, z) and can be placed anywhere in the structure by the user. The region opposite of the normal for the origin plane is assigned material A and the region opposite of the normal for the terminus plane is assigned material B. Control of the gradient bounds allows for the bicontinous mesostructure to be placed at any location in the part. Examples of various gradient origin and terminus plane locations are shown in FIGS. 9A-9D. An initial interface length of 40 mm and a normal vector of {1,0,0} is shown for reference in FIG. 9A. In FIG. 9B the interface length has been decreased to 4 mm using the same normal vector. FIG. 9C has a 10 mm interface and its normal vector {0,1,0} has been rotated to parallel they axis. Lastly in FIG. 9D, an interface length of 40 mm is used and a normal vector of {0.7,0.7,0.3}.

3. Unit Cell Period Gradient

Figure 10A:
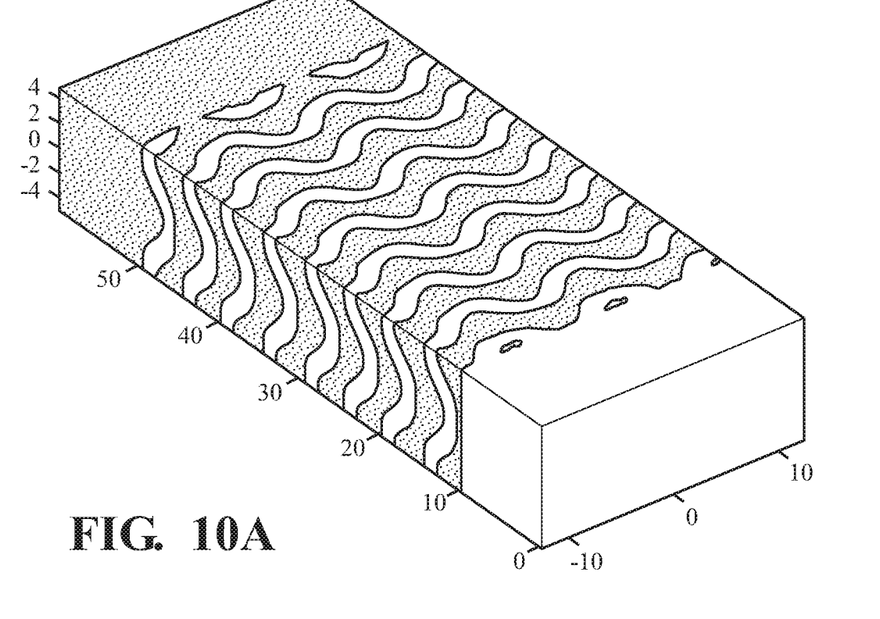
FIGS. 10A and 10B are schematics showing the effect of changing the orientation of the TPMS unit cell, with a unit cell orientation of {1,0,0} in FIG. 10A and with a unit cell orientation of {1,1,1} in FIG. 10B.
Figure 10B:
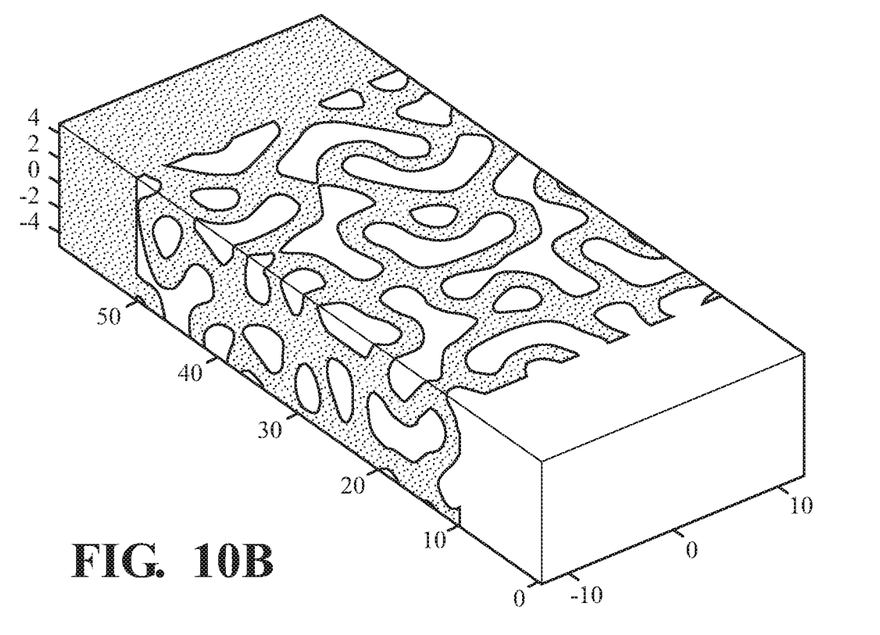

The concept of functional gradients also extends to the periods of the unit cell, which can be graded through the bulk of a part as seen in FIGS. 10A-10B. The size of the unit cell changes depending on the starting and ending conditions set by the user by indicating the initial and end period lengths. FIG. 10A show a unit cell with a constant period of 10 mm. FIG. 10B shows a smaller unit cell with a period of 5 mm transition to a larger unit cell with a period of 15 mm within the gradient region. A potential application for this is to incorporate stiffness matching between the two component lattices into the design process. By developing a relationship between the period length and the resulting modulus, regions of a component could be tailored to the specific needs of the application.

4. Unit Cell Orientation

Figure 11A:
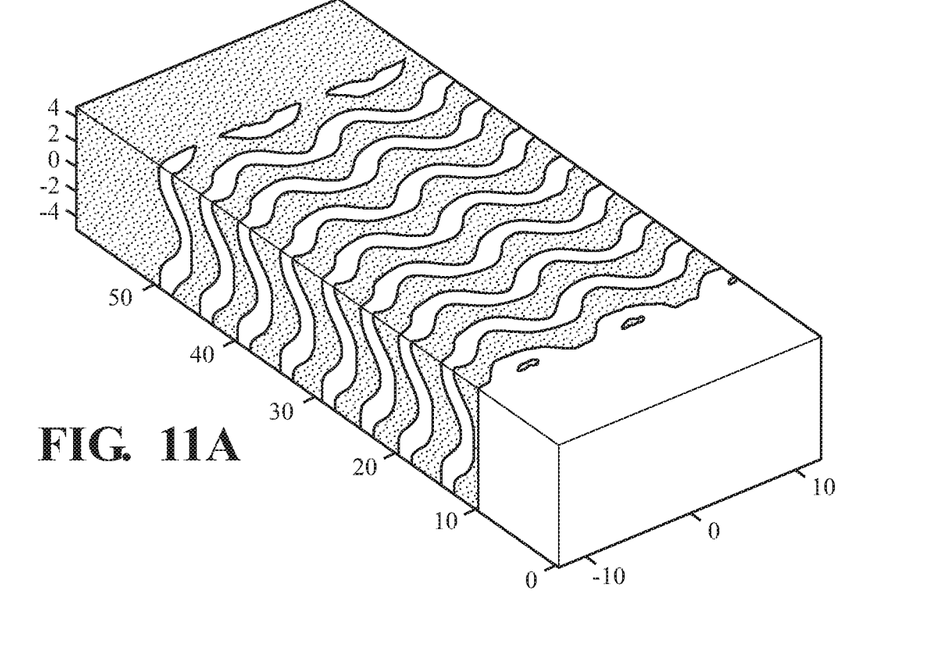
FIGS. 11A and 11B are schematics showing the effect of changing the period of the TPMS with a constant period of 10 mm in FIG. 11A and with the period changing linearly from 5 mm to 15 mm in FIG. 11B.
Figure 11B:
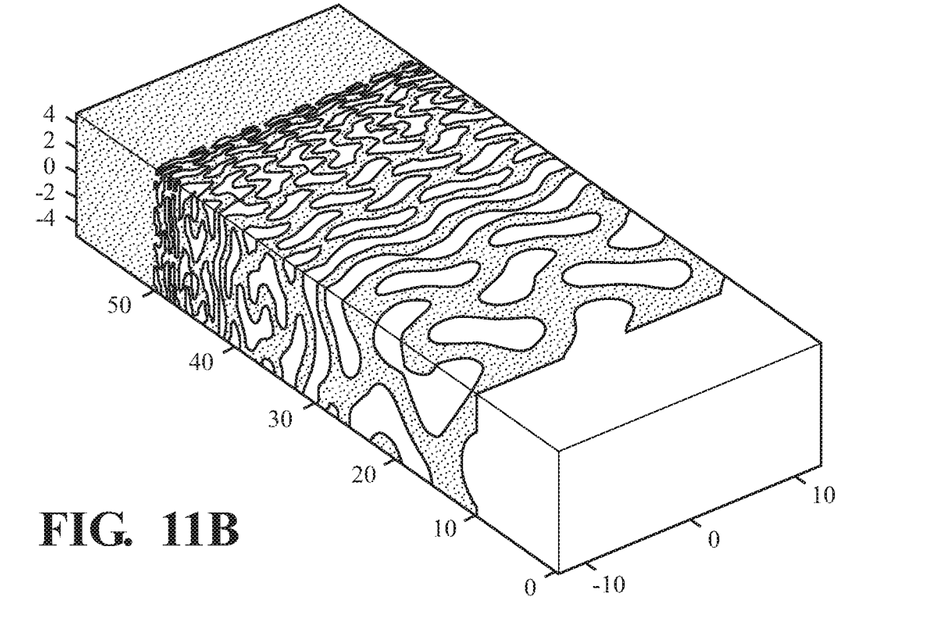

The orientation of the unit cell can be modified so that it is aligned with a specific vector (x, y, z). The unit cell orientation is changed by the user defining the direction of the unit cell x-axis relative to the part's local coordinate frame. The orientation of the unit cell could have significant impact on the mechanical properties of the mesostructure, such as strength and compliance. Changes in unit cell orientation of lattice structures have been shown to affect mechanical properties. FIG. 11B shows an example where the unit cell has been rotated by the unit vector (1, 1, 1). This allows for the unit cells to be oriented in line with the expected loading conditions. The ability to rotate the unit cell is important for aligning any anisotropic properties of the unit cell with the design requirements.

Material Assignment and Manufacturing

With all parameters defined by the user, the algorithm then defines a material for each voxel. One Comma Separated Variable (CSV) point cloud file that represents the surface of each component material is generated. The CSV format is not compatible with slicing algorithms that generate the toolpaths for material extrusion machines, so it must be converted to a STL file. Avizo (FEI Company, Hillsboro, Oreg., USA) was used to create a triangular mesh of the surface point cloud. This triangular mesh can then be saved as a STL file. Converting back to a STL file so that the part is manufacturable creates minor geometric errors due to the tessellation of the curved surfaces. More importantly, the meshing process often does not create a single continuous surface, commonly referred to as "watertight." Converting the initial meshed surface to one that is "watertight" can become non-trivial due to the number of errors in the mesh. STL files were modified using Magics (Materalise NV, Leuven, BE) to ensure "watertightness."

Figure 12A:
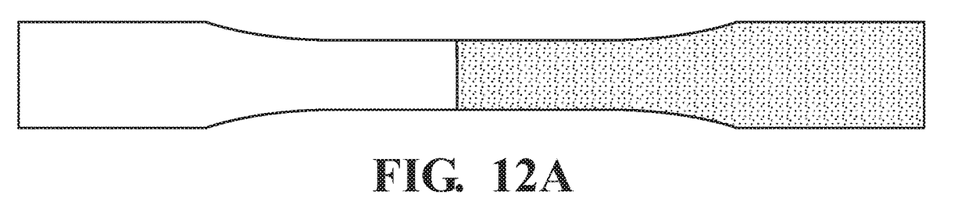
FIG. 12A is a sketch showing an example of a binary specimen.
Figure 12B:
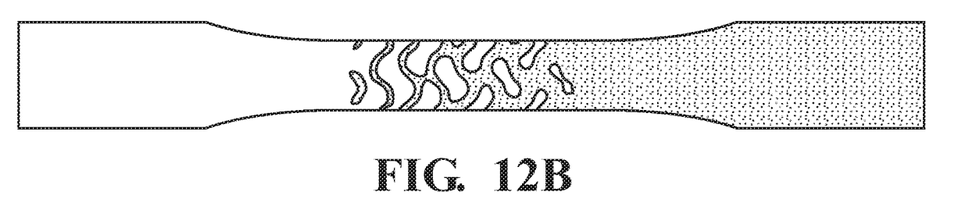
FIG. 12B is a sketch showing an example of a gyroidal tensile specimen.

To eliminate any possible alignment errors of the two component material STL files in Slic3r gcode generation software, the STL files were aligned in Magics and saved as one STL file. This STL file was then loaded into Slic3r, which is able to identify independent shells. These two independent shells in a single STL file were used to generate specimen production toolpaths Mechanical Testing To further understand the impact of the present process on part performance, an initial run of mechanical property tests was performed. The gyroid mesostructure strength was evaluated first. Specimens consisting of both a graded gyroidal mesostructure and a binary material interface were tested in uniaxial tension. FIG. 12 shows an example of the gyrodial specimen, with the gyroid region in the tapered middle region.

Figure 13:
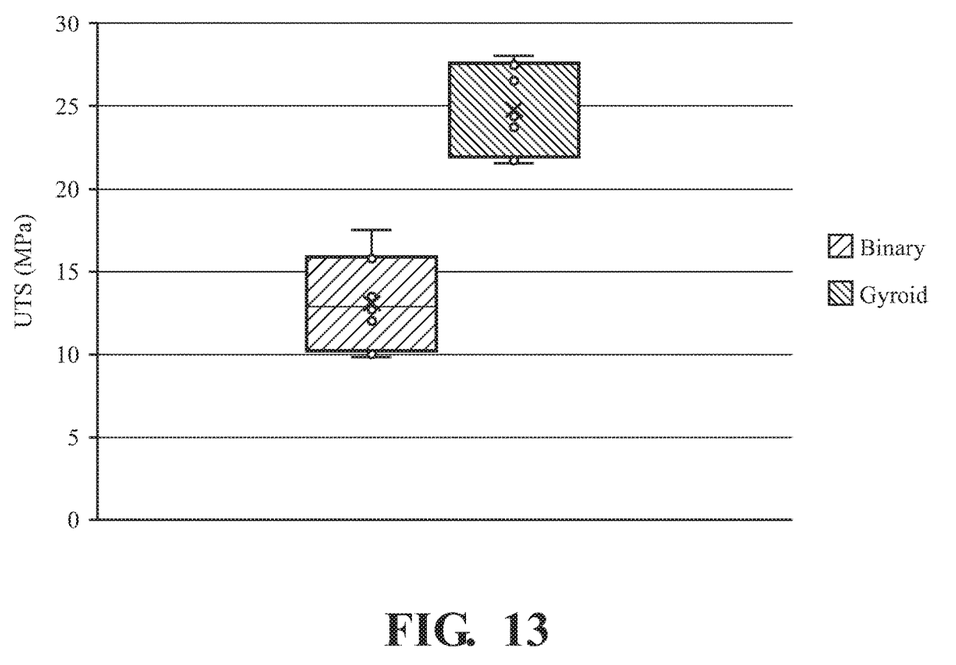
FIG. 13 is a Box and Whisker plot comparison of binary and gyroid interface UTS data.

The parameters used to generate the mesostructure are shown in Table 1. To eliminate as many experimental variables as possible, the same Acrylonitrile-Butadiene-Styrene (ABS) filament feedstock was used for both components of the graded mesostructure specimens, and both halves of the binary interface specimens. The 1.75 mm diameter ABS filament feedstock was produced by COEX (COEX LLC, Appleton, Wis., USA). To ensure that the tensile specimens include at least one full period of the gyroid along each of the local coordinate axes, an ASTM D638 Type I [20] tensile specimen was modified to have a thickness of 10 mm. The binary interface specimens were also produced in this geometry, ensuring a one-to-one comparison of the mechanical response of the two types of interface. All specimen were produced in XY orientation on a Mendel Max 3 (Maker's Tool Works, OK, USA) material extrusion AM machine, with an extrusion temperature of 235° C. and a deposition surface temperature of 120° C. Tensile test results for the binary and gyroid specimens show ultimate tensile strengths of 13.01±1.92 MPa and 24.86±1.78 MPa respectively. This is further summarized in FIG. 13. 95% confidence intervals were calculated using the student's t-distribution for a sample size of 10.

TABLE 1

Design parameter values used to generate the graded mesostructure tensile specimen.

| Mesostructure Design Parameter | Value |
| --- | --- |
| Unit cell type | Gyroid |
| Unit cell period | 10 mm |
| Unit cell orientation | {1, 0, 0} (local {X, Y, Z}) |
| Gradient length | 40 mm |
| Gradient Origin | {1, 0, 0} (local {X, Y, Z}) |

TABLE 1-continued

Design parameter values used to generate the graded mesostructure tensile specimen.

| Mesostructure Design Parameter | Value |
| --- | --- |
| Gradient Terminus | {1, 0, 0} (local {X, Y, Z}) |
| Gradient Direction | {1, 0, 0} (local {X, Y, Z}) |

TABLE 2

Ultimate Tensile Strength of binary and gyroid interface specimen. 95% confidence intervals shown calculated using student's t-distribution.

| Interface Type | Ultimate Tensile Strength |
| --- | --- |
| Binary | 13.01 ± 1.92 MPa |
| Gyroid | 24.86 ± 1.78 MPa |

As shown, the mean graded mesostructure interface was 91% stronger than the mean binary interface. A comparison of the fracture surfaces of the two types of interface shows that the binary interface specimens each fractured along the binary interface and the resulting fracture surface was planar, while the fracture surface of the gyroidal interface specimen was much more complex since there is much more crazing deformation present at the graded mesostructure interface fracture surface. This, along with the increased strength, is an indication of better fusion at the fracture surface between the two component structures.

As will be clear to those of skill in the art, the embodiments of the present invention illustrated and discussed herein may be altered in various ways without departing from the scope or teaching of the present invention. Also, elements and aspects of one embodiment may be combined with elements and aspects of another embodiment. It is the following claims, including all equivalents, which define the scope of the invention.

REFERENCES

[1] T. Hirai, R. Watanabe, T. Hirano, T. Hirai, and D. Industries, "A Conce tra i 0 Comp ne t," 1988.
[2] ISO/ASTM, ISO/ASTM 52900-2015: Additive manufacturing—General principles—Terminology. 2015.
[3] M. L. Griffith, L. D. Harwell, J. T. Romero, E. Schlienger, C. L. Atwood, and J. E. Smugeresky, "Multi-Material Processing by LENS™," Proc. 8th Solid Free. Fabr. Symp., pp. 387-394, 1997.
[4] J. Aboudi, M. J. Pindera, and S. M. Arnold, "Higher-order theory for functionally graded materials," Compos. Part B Eng., vol. 30, no. 8, pp. 777-832, 1999.

The invention claimed is:

1. A method of creating a functionally-graded multi-material (FGM) part in multi-material additive manufacturing using an additive manufacturing machine, the method comprising the steps of:
providing a geometry of the part digitized into voxels, each voxel having a voxel size;
generating a lattice structure comprised of a series of unit cells combined in a repeated fashion, each unit cell being nonrepeating constituents of the lattice structure, each unit cell generated by a surface defined by a continuous function;
taking an inverse volume of the lattice structure within the part;
creating a material gradient by varying a thickness of the surface at the boundary between the lattice structure and the inverse volume;
assigning one of two FGM component materials to the voxels in a volume occupied by the lattice structure and assigning the other of the two FGM component materials to the voxels in the volume occupied by the inverse volume;
outputting the voxels each with a designated material as a data file;
manufacturing the part based on the data file;
wherein the lattice structure and the inverse volume form a mechanical interlock at the interface of the two component materials.

2. The method of claim 1, wherein the lattice structure and the inverse volume are each continuous discrete structures and form a bicontinous mesostructure.

3. The method of claim 1, wherein the unit cell is the smallest nonrepeating constituents of the lattice structure.

4. The method of claim 1, wherein the multi-material part includes more than two component materials.

5. The method of claim 1, wherein the resolution of the part is adjusted by adjusting the voxel size.

6. The method of claim 1, wherein the resolution of the part is adjusted by adjusting a minimum feature size of the additive manufacturing machine.

7. The method of claim 6, wherein the voxel size is set to half of the minimum feature size of the additive manufacturing machine or an intended layer thickness, whichever is smaller, to minimize a stair casing effect.

8. The method of claim 1, wherein the lattice structure is adjusted by varying parameters of the unit cell including a unit cell period, a unit cell period gradient, gradient bounds and/or a unit cell orientation.

9. The method of claim 2, wherein the unit cell period is constant.

10. The method of claim 1, wherein the continuous function is a triply periodic minimal surface (TPMS).

11. The method of claim 1, wherein the two component materials are immiscible.

* * * * *